US012459726B2

(12) United States Patent
Kneer et al.

(10) Patent No.: US 12,459,726 B2
(45) Date of Patent: Nov. 4, 2025

(54) CARTRIDGE SYSTEM FOR DELIVERING AN AQUEOUS SOLUTION

(71) Applicant: Gaplast GmbH, Altenau (DE)

(72) Inventors: Stephan Kneer, Farchant (DE); Roland Kneer, Farchant (DE); Kasim Yilginc, Oberammergau (DE)

(73) Assignee: Gaplast GmbH, Altenau (DE)

( * ) Notice: Subject to any disclaimer, the term of this patent is extended or adjusted under 35 U.S.C. 154(b) by 180 days.

(21) Appl. No.: 18/397,051

(22) Filed: Dec. 27, 2023

(65) Prior Publication Data

US 2024/0262603 A1 Aug. 8, 2024

(30) Foreign Application Priority Data

Feb. 2, 2023 (DE) .................. 10 2023 102 632.1

(51) Int. Cl.
| | |
|---|---|
| *B65D 1/02* | (2006.01) |
| *B05B 11/00* | (2023.01) |
| *B05B 15/30* | (2018.01) |
| *B65D 77/06* | (2006.01) |
| *B65D 81/32* | (2006.01) |
| *B65D 83/00* | (2006.01) |
| *B65D 83/76* | (2006.01) |
| *B05B 11/10* | (2023.01) |

(52) U.S. Cl.
CPC ........ *B65D 83/765* (2025.01); *B05B 11/0081* (2013.01); *B05B 15/30* (2018.02); *B65D 1/02* (2013.01); *B65D 77/06* (2013.01); *B65D 81/325* (2013.01); *B65D 83/7713* (2025.01); B05B 11/106 (2023.01); B65D 2501/0063 (2013.01); B65D 2583/005 (2013.01)

(58) Field of Classification Search
CPC ........ B65D 83/765; B65D 1/02; B65D 77/06; B65D 81/325; B65D 83/7713; B65D 2501/0063; B65D 2583/005; B05B 15/30; B05B 11/106; B05B 11/0081
See application file for complete search history.

(56) References Cited

U.S. PATENT DOCUMENTS

| | | | |
|---|---|---|---|
| 4,152,378 A * | 5/1979 | Vcelka | A61J 1/05 261/DIG. 65 |
| 6,412,659 B1 | 7/2002 | Kneer | |

(Continued)

FOREIGN PATENT DOCUMENTS

DE  19742559 C2  8/1999

*Primary Examiner* — Frederick C Nicolas
(74) *Attorney, Agent, or Firm* — Greer, Burns & Crain, Ltd

(57) ABSTRACT

A cartridge system for delivering an aqueous solution made with a mixture of an active material and a liquid medium, where the cartridge system includes a bottle-shaped container and a pump fastened to a neck of the container, where the container is filled with the liquid medium. The container includes a cartridge and an intake tube of the pump sealingly inserted in an upper side of the cartridge, where the active material is supplied to the cartridge through the intake tube. The cartridge is sealed from an exterior by a piston or a stopper, where the piston or stopper is movably arranged in a wall of the cartridge and configured to enter into an interior of the cartridge under reduced pressure produced by the pump and opens to the exterior of the cartridge so that the active material is mixable with the liquid medium.

11 Claims, 4 Drawing Sheets

(56) References Cited

U.S. PATENT DOCUMENTS

| | | | |
|---|---|---|---|
| 7,367,709 B2* | 5/2008 | Ki | B05B 11/0081 366/130 |
| 8,701,936 B2* | 4/2014 | Thomas | B05B 11/0081 422/258 |
| 9,434,526 B2* | 9/2016 | Son | A45D 34/04 |
| 10,618,069 B2* | 4/2020 | Goettke | G01F 11/021 |
| 2013/0153602 A1 | 6/2013 | Thomas et al. | |
| 2013/0228482 A1 | 9/2013 | Son | |
| 2013/0345497 A1 | 12/2013 | Simmet | |
| 2015/0367368 A1 | 12/2015 | Scherer | |
| 2021/0268213 A1 | 9/2021 | Jung et al. | |

* cited by examiner

CARTRIDGE SYSTEM FOR DELIVERING AN AQUEOUS SOLUTION

PRIORITY CLAIM

The subject application claims convention priority to German patent application No. DE 10 2023 102 632.1, filed Feb. 2, 2023.

BACKGROUND

The invention relates to a cartridge system for delivering an aqueous solution, which consists of a mixture of an active material with a liquid medium, including a bottle-shaped container, fastened to the neck of which there is a pump, the intake tube of which projects into the container.

There are many materials and pharmaceutical agents which are not stable for a long period of time in an aqueous solution. These include e.g. vitamin C, benzoyl peroxide, steroids for aerosol applications with pulmonary diseases etc., whereby this list is only by way of example. For this reason, it is advantageous to maintain such active materials or agents and the associated liquid medium apart for as long as possible before the use of the aqueous solution.

It is the object of the present invention to provide a system with which the user can mix the active material to be administered with the associated aqueous solution only directly before use, whereby the system should be easily manageable for everyone.

SUMMARY

The invention provides that the container is fillable with the liquid medium, that arranged in the container there is a cartridge, sealingly inserted into the upper side of which is the intake pipe of the pump, that the active material is fillable into the cartridge, that the cartridge is sealed from the exterior by at least one piston or stopper, which is movably arranged in a wall of the cartridge and enters into the interior of the cartridge under the action of reduced pressure produced by the pump and opens it to the exterior so that the active material is mixable with the liquid medium. In order to achieve as complete as possible mixing of the active material with the liquid medium, the container is shaken by the user so that a substantially homogenous aqueous solution forms in the container and the cartridge, which the user can deliver by further actuation of the pump. This system is very simple to operate.

It is proposed with advantage that the at least one piston is situated in a tubular chamber, which is open to the exterior and which is inserted into the base wall or peripheral wall of the cartridge or is constructed integrally with it. Two or more tubular chambers can be set into the cartridge wall, which are sealed by pistons, which are movably situated in the tubular chambers.

It is provided in a preferred embodiment of the invention that the cartridge includes an upper chamber, into which the active material is fillable, and an adjacent lower chamber of smaller cross-sectional dimensions, the open underside of which is sealed by a piston arranged therein, which is situated to be movable in the lower chamber under the action of reduced pressure in the cartridge and on entry into the upper chamber opens the cartridge to the exterior and downwardly to the liquid medium so that the active material is mixable with the liquid medium.

In more detail, it is proposed that the upper chamber includes a cylindrical peripheral wall, preferably a circular cylindrical peripheral wall, into which the intake tube of the pump fastened onto the container is sealingly insertable. In one embodiment, the upper chamber has an upper connecting annular wall and a centrally connecting circular cylindrical inner wall of smaller diameter, which projects inwardly and into which the intake tube is sealingly inserted. The lower chamber should consist of a cylindrical, preferably circular cylindrical, tube, which is sealingly inserted into the peripheral wall of the upper chamber and is fastened, preferably secured by adhesive, to it. The two chambers are preferably manufactured in an injection moulding process, either separately or integrally.

It is further proposed that the piston is situated as a press fit in the lower chamber such that the piston seals the chamber but is movable in the cartridge under the action of reduced pressure.

On actuation of the pump, the piston slides upwardly in the lower chamber and then enters into the upper chamber of larger diameter, whereby an opening, preferably an annular gap, is produced, through which the active material can pass out of the cartridge into the interior of the container and can enter through the liquid medium into the upper chamber. The active material can thus be effectively mixed with the liquid medium before the mixture is delivered by further actuation of the pump.

In order that the piston, which has moved upwardly in the cartridge, cannot close the intake pipe of the pump, an abutment for the piston is conveniently arranged beneath the intake tube arranged therein. For this purpose, a grid element can be inserted into the upper chamber, which is fixed in position by a projection on the chamber wall.

The active material can be in powder form or be poured into the cartridge in a liquid consistency.

In order that the user finds out when he should shake the container in order to be able to deliver the desired aqueous solution, it is proposed with great advantage that the container and the cartridge consist of a transparent plastic material.

In accordance with a further very advantageous proposal of the invention, the container can consist of a stiff outer container and a deformable inner bag, into which no atmospheric air passes for the purpose of pressure balance after delivering the contents of the container but instead into the gap between the outer container and the inner bag. In this embodiment of the invention, the inner bag is filled with the liquid medium in which the cartridge is also situated. Further environmental influences, such as humidity, oxygen, UV light and microorganisms, are thus minimised whereby the aqueous solution to be delivered is stable for an even longer period of time.

BRIEF DESCRIPTION OF THE DRAWINGS

Further details of the invention will be apparent from the following description and with reference to the drawings, in which.

Figure 1:
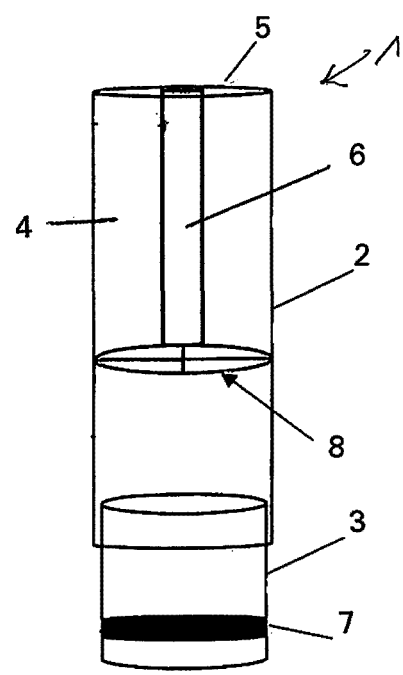
FIG. 1 is a schematic view of one embodiment of a cartridge in accordance with the invention.
Figure 2:
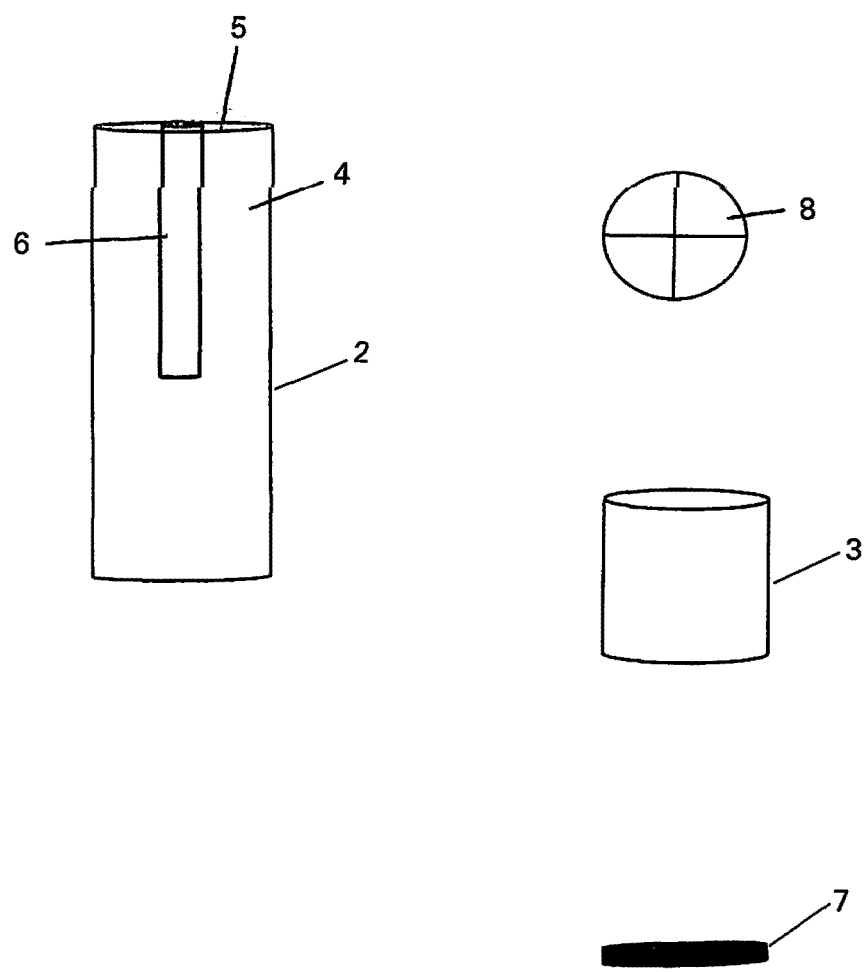
FIG. 2 shows the four components of the cartridge in accordance with FIG. 1.

The cartridge 1 consists of an upper, circular cylindrical chamber 2 and a lower chamber 3, which is also circular cylindrical and which has a smaller diameter than the upper chamber 2. The upper end section of the lower chamber 3 is inserted into the downwardly open upper chamber 2 and fastened to the upper chamber 2 in a suitable manner, for instance secured in it by adhesive. The upper chamber 2 consists of the cylindrical peripheral wall 4, an upper annular cover wall 5 and a circular cylindrical tube 6, which extends from the edge of the central opening in the annular cover wall into the upper chamber and which has such a diameter that an intake tube, which is not shown, of a bottle pump attached to the container is sealingly insertable.

Arranged in the lower chamber of the cartridge 1 as a press fit is a piston 7, which seals the lower chamber 3 and thus the cartridge 1 against the entry of a liquid medium, with which the container (not shown) has been filled and in which the cartridge is immersed.

Situated in the lower chamber 2 below the tube 6 or the intake tube of the pump there is a piston-catching grid 8, which prevents the tube 6 being closed by the piston 7, when the piston 7 is sucked up a chamber 2 by reduced pressure produced by the pump.

The active material is inserted into the upper chamber 2, whereafter the piston 7 is inserted into the lower chamber 3. The intake tube or the pump stem of a bottle pump is plugged onto the cartridge thus filled, whereafter the cartridge is inserted into an Airless bottle filled with a liquid medium and the bottle pump is fastened to the neck of the bottle. In this condition, the cartridge system is ready to deliver an aqueous solution but the two components of it are separated from one another so that the active substance is stable for a long period of time.

In order to be able to administer the aqueous solution the user of the cartridge system actuates the pump so that a reduced pressure is produced in the cartridge, which causes the piston 7 to rise in the lower chamber 3, whereby the level of the liquid medium in the lower chamber 3 rises also. When the piston 7 has arrived at the upper end of the lower chamber 3, it is drawn into the upper chamber. Since the piston 7 has a smaller diameter than the upper chamber 2, the liquid medium located in the bottle now penetrates also into the upper chamber so that the active material located in the upper chamber can mix with the liquid medium. Rapid substantially homogeneous mixing is achieved by shaking the bottle. The piston 7 drawn into the upper chamber floats in the upper chamber, whereby the piston-catching grid 8 prevents the piston being drawn against the tube 6 and blocking it. The active material mixed in the liquid medium can now be removed or applied by further pumping of the bottle by the user.

Instead of the piston-catching grid 8, blocking of the tube 6 can be prevented by a suitable shaping of the upper side of the piston.

Figure 3:
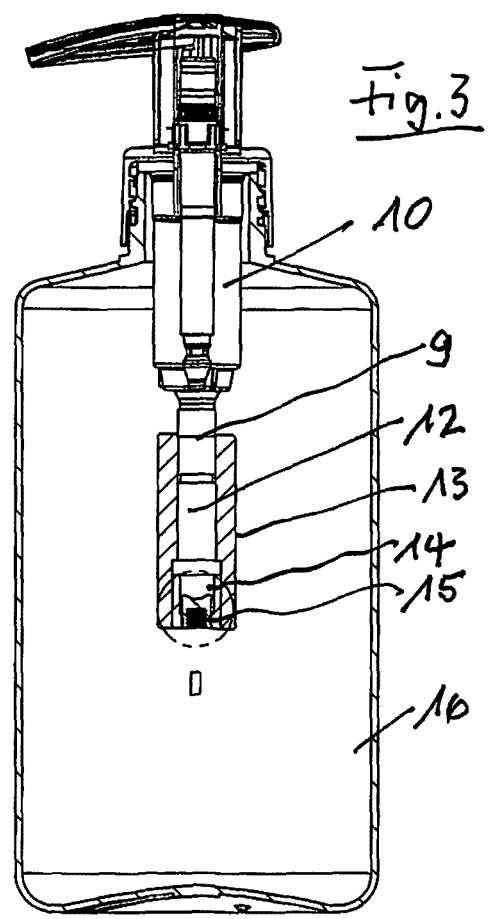
FIG. 3 is a substantially schematic view of one embodiment of the cartridge system in accordance with the invention.

As shown schematically in FIG. 3, the pump stem 9 of a pump 10 engages sealingly in the upper chamber 12, which accommodates an active material, of a cartridge 13.

Fastened to the lower end of the upper chamber 12 is a lower chamber 14 of smaller diameter, sealingly arranged in which is a piston 15. When a reduced pressure is produced by the pump 10 in the chamber 12, the piston 15 is sucked into the chamber 12, whereby the cartridge 13 is opened and the active material can be mixed with the liquid medium in the bottle 16.

Figure 4:
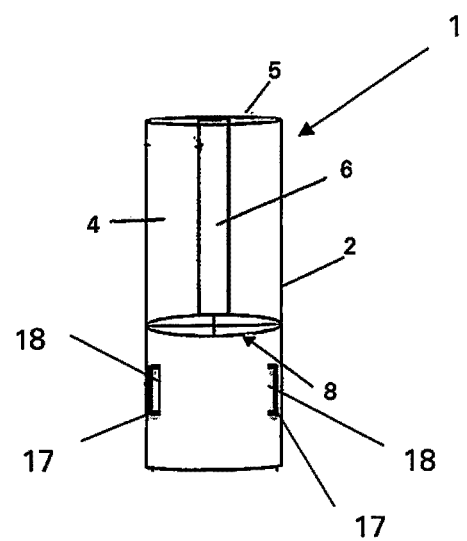
FIG. 4 is a schematic view of a further embodiment of the invention.

In the embodiment of FIG. 4, set into the peripheral wall of the cartridge 1 there are two tubular, outwardly open chambers 18, situated in which are respective pistons 17 in a press fit, whereby the two pistons 17 are sucked by reduced pressure in the cartridge into its interior in order to open the cartridge so that the liquid medium can enter into the cartridge. The two pistons are arranged diametrically opposite to one another.

The invention claimed is:

1. A cartridge system for delivering an aqueous solution made with a mixture of an active material with a liquid medium, the cartridge system comprising container and a pump fastened to a neck of the container, wherein the container is fillable with the liquid medium, the pump includes a cartridge and an intake tube, wherein the intake tube of the pump is sealingly inserted in an upper side of the cartridge, wherein the active material is filled into the cartridge, and wherein the cartridge is sealed from an exterior by at least one piston or stopper, the at least one piston or stopper being movably arranged in a wall of the cartridge and configured to enter into an interior of the cartridge under reduced pressure produced by the pump and opens to the exterior so that the active material is mixed with the liquid medium.

2. The cartridge system as claimed in claim 1, wherein the at least one piston or stopper is situated in a tubular chamber, which is open to the exterior and which is inserted into a base wall or a peripheral wall of the cartridge or is constructed integrally with the cartridge.

3. The cartridge system as claimed in claim 1, wherein the cartridge includes two or more tubular chambers.

4. The cartridge system as claimed in claim 1, wherein the cartridge includes an upper chamber into which the active material is filled, and an adjacent lower chamber of smaller diameter, which is sealed from the exterior by the at least one piston or stopper and enters into the upper chamber due to the reduced pressure and thus opens the cartridge to the exterior.

5. The cartridge system as claimed in claim 4, wherein the upper chamber includes a circular cylindrical peripheral wall, an annular upper wall and a centrally connected, circular cylindrical tube of smaller diameter, which projects into an interior of the upper chamber and into which the intake tube of the pump is sealingly inserted.

6. The cartridge system as claimed in claim 4, the lower chamber of the container includes a cylindrical tube, which is sealingly inserted into a peripheral wall of the upper chamber or is constructed integrally with the upper chamber.

7. The cartridge system as claimed in claim 4, wherein the at least one piston or stopper is situated as a press fit in the lower chamber.

8. The cartridge system as claimed in claim 1, further comprising an abutment for the at least one piston or stopper is arranged in the upper chamber below the intake tube of the pump.

9. The cartridge system as claimed in claim 8, further comprising a grid element arranged as the abutment.

10. The cartridge system as claimed in claim 1, wherein the container and the cartridge consist of a transparent plastic material.

11. The cartridge system as claimed in claim 1, wherein the active material is in powder form or is a liquid.

\* \* \* \* \*